US012654264B2

(12) United States Patent
Dumitrache et al.

(10) Patent No.: US 12,654,264 B2
(45) Date of Patent: Jun. 16, 2026

(54) GAS TURBINE ENGINE GEARBOX ALIGNMENT TOOL AND METHOD

(71) Applicant: Pratt & Whitney Canada Corp., Longueuil (CA)

(72) Inventors: Paul Dumitrache, Brossard (CA);
Łukasz Pokrzywa, Trzebownisko (PL);
Michel Labbe, Montreal (CA);
Frederic Labrie, St-Jude (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/902,862

(22) Filed: Sep. 30, 2024

(65) Prior Publication Data

US 2026/0091455 A1      Apr. 2, 2026

(51) Int. Cl.
*B23P 19/10* (2006.01)
*F02C 7/36* (2006.01)
(52) U.S. Cl.
CPC ............... *B23P 19/10* (2013.01); *F02C 7/36* (2013.01); *F05D 2230/64* (2013.01)
(58) Field of Classification Search
CPC ......... B23P 19/10; F02C 7/36; F05D 2230/64
See application file for complete search history.

(56) References Cited

U.S. PATENT DOCUMENTS

| | | | |
|---|---|---|---|
| 9,046,041 B2 | 6/2015 | Rejman | |
| 9,611,787 B2 | 4/2017 | Wotzak | |
| 12,006,875 B1 | 6/2024 | Snyder | |
| 2011/0187122 A1 | 8/2011 | Martinez | |
| 2013/0200231 A1 | 8/2013 | Catteau | |
| 2013/0326891 A1 | 12/2013 | Alexander | |
| 2014/0250916 A1 | 9/2014 | Cabeen | |
| 2018/0216829 A1 | 8/2018 | Kolvick | |
| 2025/0290746 A1 | 9/2025 | Torres | |

FOREIGN PATENT DOCUMENTS

| | | |
|---|---|---|
| CN | 222627027 U | 3/2025 |
| CN | 223160411 U | 7/2025 |
| WO | 2024108270 A1 | 5/2024 |

OTHER PUBLICATIONS

Anonymous: "Phased Array Slip Joint Probe Holders JIREH", Jun. 21, 2024 (Jun. 21, 2024), pp. 1-11, XP093366245, Retrieved from the Internet: URL:https://web.archive.org/web/20240621024139/ https://www.jireh.com/products/phased-array-slip-joint-probe-holders/.
EP Search Report for EP Patent Application No. 25205892.0 dated Feb. 23, 2026.

*Primary Examiner* — Moshe Wilensky
(74) *Attorney, Agent, or Firm* — Getz Balich LLC

(57) ABSTRACT

A method of and tool for positionally aligning a gearbox of a gas turbine engine is provided. The method includes: providing an alignment tool that includes a plurality of probe pins and a support flange; attaching the alignment tool to an engine case of the gas turbine engine; engaging the gearbox with the engine case; positionally aligning the gearbox by contacting a first surface of the gearbox with a first probe pin of the plurality of probe pins, and contacting a second surface of the gearbox with a second probe pin of the plurality of probe pins; and securing the gearbox to the engine case while the first probe pin is in contact with the first surface of the gearbox and the second probe pin is in contact with the second surface of the gearbox.

10 Claims, 7 Drawing Sheets

GAS TURBINE ENGINE GEARBOX ALIGNMENT TOOL AND METHOD

BACKGROUND OF THE INVENTION

1. Technical Field

The present disclosure relates to gas turbine engines in general, and to methods and apparatus for aligning a gearbox for a gas turbine engine gearbox in particular.

2. Background Information

In some gas turbine configurations, gearboxes and shafts may be used to power auxiliary components. The gearboxes and shafts must be aligned to ensure proper operation. In some instances the alignment may be performed by hand. In some instances, however, the accuracy of the alignment is critical, especially relevant when dealing components such as gears. If alignments are not done properly, the mesh and splines of the gears may be further misaligned, which may have detrimental effects on the performance of the gears and shaft spline connections.

SUMMARY

According to an aspect of the present disclosure, a method of positionally aligning a gearbox of a gas turbine engine is provided. The method includes: providing an alignment tool that includes a plurality of probe pins and a support flange; attaching the alignment tool to an engine case of the gas turbine engine; engaging the gearbox with the engine case; positionally aligning the gearbox by contacting a first surface of the gearbox with a first probe pin of the plurality of probe pins, and contacting a second surface of the gearbox with a second probe pin of the plurality of probe pins; and securing the gearbox to the engine case while the first probe pin is in contact with the first surface of the gearbox and the second probe pin is in contact with the second surface of the gearbox.

In any of the aspects or embodiments described above and herein, the first surface of the gearbox and the second surface of the gearbox may be the same surface.

In any of the aspects or embodiments described above and herein, the alignment tool may be configured so that the plurality of probe pins are axially translatable.

In any of the aspects or embodiments described above and herein, the support flange may include a support flange first segment configured for attachment to the engine case, and wherein the alignment tool may include an axial adjustment mechanism in communication with the plurality of probe pins, wherein the axial adjustment mechanism may be engaged with the support flange and may be configured to axially translate the plurality of probe pins relative to the support flange.

In any of the aspects or embodiments described above and herein, the alignment tool may further includes a plurality of slide rods and a probe plate. The slide rods may be attached to the probe plate and may be in sliding engagement with the support flange.

In any of the aspects or embodiments described above and herein, the axial adjustment mechanism may include a shaft and a rotational couple. The shaft may be threadedly engaged with the support flange, and the rotational couple may be engaged with the probe plate. The step of positionally aligning the gearbox may include axially translating the first probe pin into contact with the first surface of the gearbox and the second probe pin into contact with the second surface of the gearbox by rotating the shaft of the axial adjustment mechanism.

In any of the aspects or embodiments described above and herein, the support flange may include a support flange second segment disposed parallel with the support flange first segment, and a support flange third segment extending between the support flange first segment and the support flange second segment. The shaft may be threadedly engaged with the support flange second segment.

In any of the aspects or embodiments described above and herein, the axial adjustment mechanism may include an adjustable locating device configured to locate a position of the probe pins. The method may include the step of rotating the shaft of the axial adjustment mechanism until the adjustable locating device is engaged with the support flange second segment.

In any of the aspects or embodiments described above and herein, the axial adjustment mechanism may include an adjustable locking device configured to positionally lock the probe pins. The method may include positionally locking the probe pins by engaging the support flange second segment with the locking device.

In any of the aspects or embodiments described above and herein, the step of attaching the alignment tool to the engine case of the gas turbine engine may include attaching the alignment tool to a flange of the engine case.

In any of the aspects or embodiments described above and herein, the step of attaching the alignment tool to the engine case of the gas turbine engine may include indirectly attaching the alignment tool to a flange of the engine case.

According to an aspect of the present disclosure, an alignment tool for aligning a gearbox for attachment to an engine case of a gas turbine engine is provided. The alignment tool includes a support flange, a plurality of probe pins, and an axial adjustment mechanism. The support flange is configured for direct or indirect attachment to the engine case of the gas turbine engine. The axial adjustment mechanism in communication with the plurality of probe pins, wherein the axial adjustment mechanism is engaged with the support flange and is configured to axially translate the plurality of probe pins relative to the support flange.

In any of the aspects or embodiments described above and herein, the support flange first segment may be parallel the support flange second segment.

In any of the aspects or embodiments described above and herein, the axial adjustment mechanism may include an locating device engaged with the shaft and the locating device may be configured to locate a position of the probe pins.

In any of the aspects or embodiments described above and herein, the rotational couple may be a ball joint.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
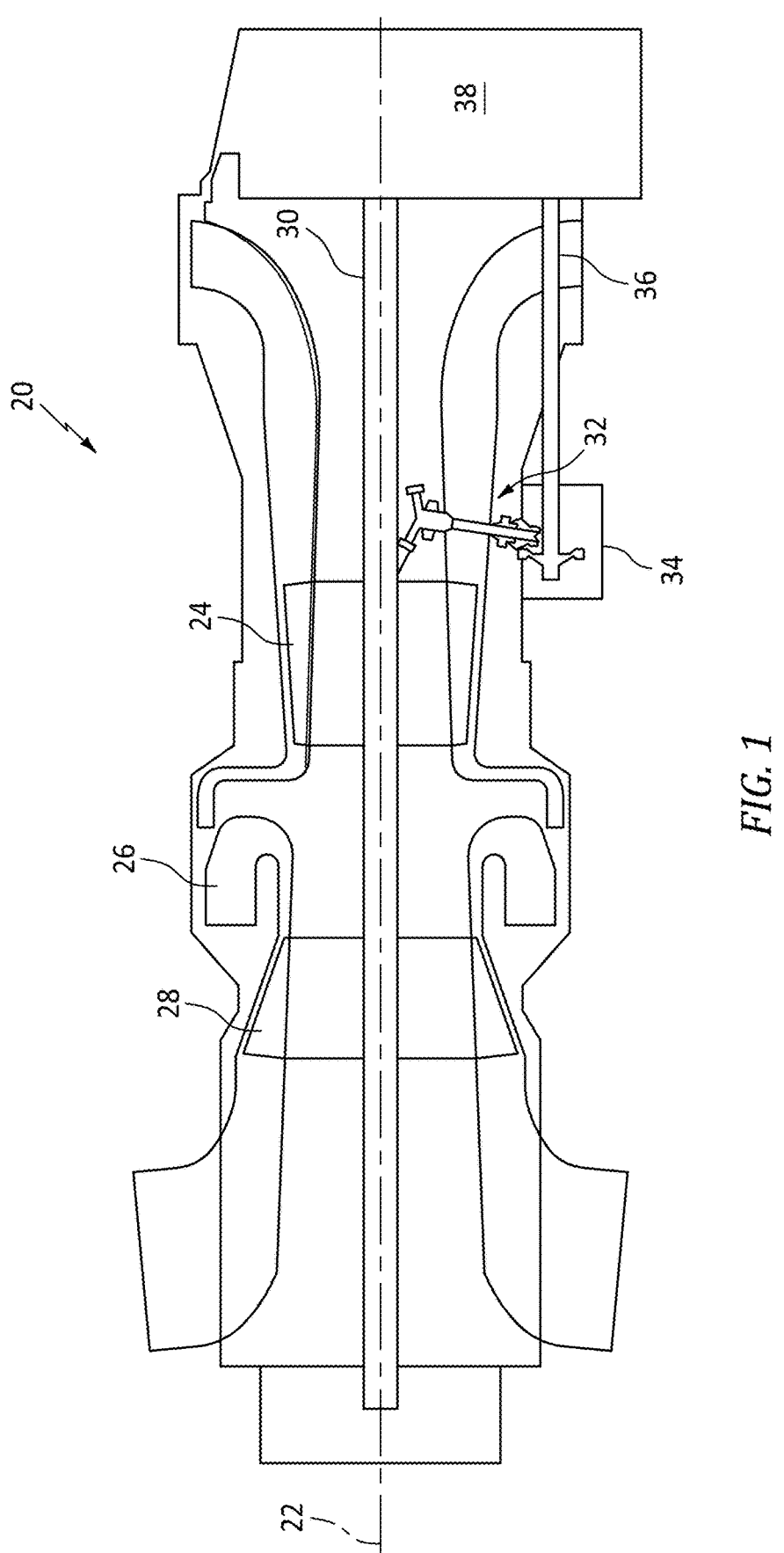
FIG. 1 is a diagrammatic sectional view of a gas turbine engine.

FIG. 1 shows a diagrammatic sectional view of a gas turbine engine 20. The gas turbine engine 20 extends along an axial centerline 22, and includes a compressor section 24, a combustor section 26, and a turbine section 28. The compressor section 24 includes a plurality of compressor stages. The turbine section 28 includes a plurality of turbine stages. In the exemplary engine 20 shown in FIG. 1, the engine sections 24, 26, 28 are disposed along the centerline 22. At least one compressor stage is connected to and driven by a turbine stage through an engine shaft 30.

The terms "forward", "leading", "aft, "trailing" are used herein to indicate the relative position of a component or surface within the gas turbine engine 20. In the gas turbine engine 20 embodiment shown in FIG. 1, the compressor section 24 is disposed forward of the turbine section 28 (in terms of core gas flow) and the turbine section 28 is disposed aft of the compressor section 24 (in terms of core gas flow). The terms "inner radial" and "outer radial" refer to relative radial positions from the engine centerline 22. An inner radial component or path is disposed radially closer to the engine centerline 22 than an outer radial component or path.

Figure 2:
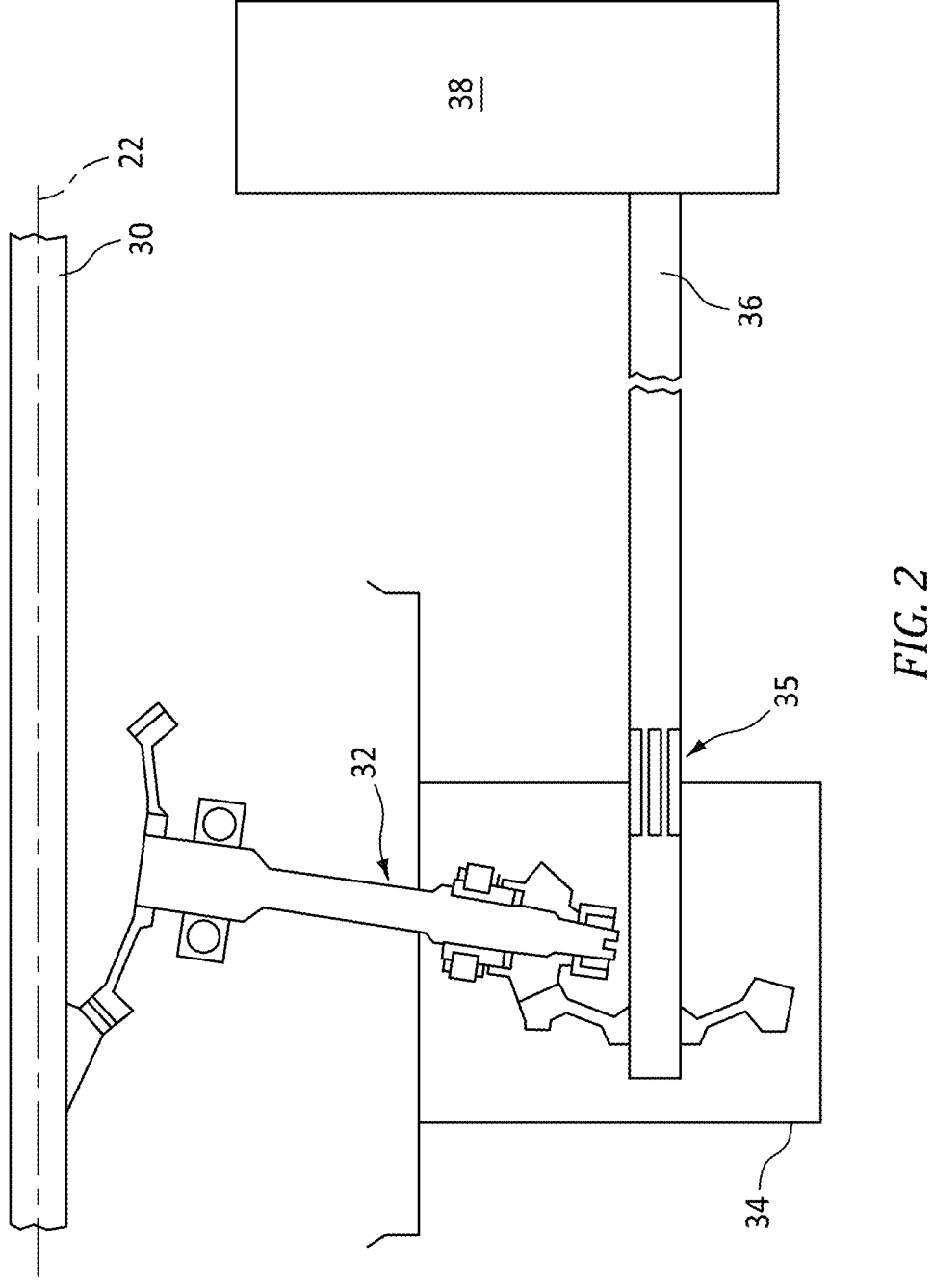
FIG. 2 is an enlarged partial view of the gas turbine engine shown in FIG. 1.

Referring to FIGS. 1 and 2, the gas turbine engine 20 includes a tower shaft assembly 32 engaged with the engine shaft 30 and an angle gearbox 34. FIG. 2 is a partial view of a portion of the gas turbine engine 20 shown in FIG. 1, enlarged to facilitate viewing of the example configuration of the tower shaft assembly 32, the angle gearbox 34, and a lay shaft 36. During operation of the gas turbine engine 20, the tower shaft 32 is driven by the engine shaft 30, and in turn the tower shaft 32 drives the angle gearbox 34. In the example embodiment shown in FIGS. 1 and 2, a bevel gear within the tower shaft assembly 32 is engaged with a mating bevel gear disposed within the angle gearbox 34. The bevel gear disposed within the angle gearbox 34, in turn, is engaged with an output shaft of the angle gearbox 34. The output shaft of the angle gearbox 34, in turn, is engaged with the lay shaft 36. The lay shaft 36 extends between the angle gearbox 34 and an accessory gearbox 38 and is in drive engagement with the angle gearbox 34 and the accessory gearbox 38. The present disclosure is not limited to any particular tower shaft assembly 32, or any particular engagement configuration between the tower shaft assembly 32 and the angle gearbox 34, or any particular internal gear arrangement within the angle gearbox 34. The present disclosure is directed to a system and method for aligning the angle gearbox 34 to ensure proper alignment between the angle gearbox 34 and the lay shaft 36 to facilitate rotational power being delivered between the angle gearbox 34 and the accessory gearbox 38 via the lay shaft 36.

Figure 3:
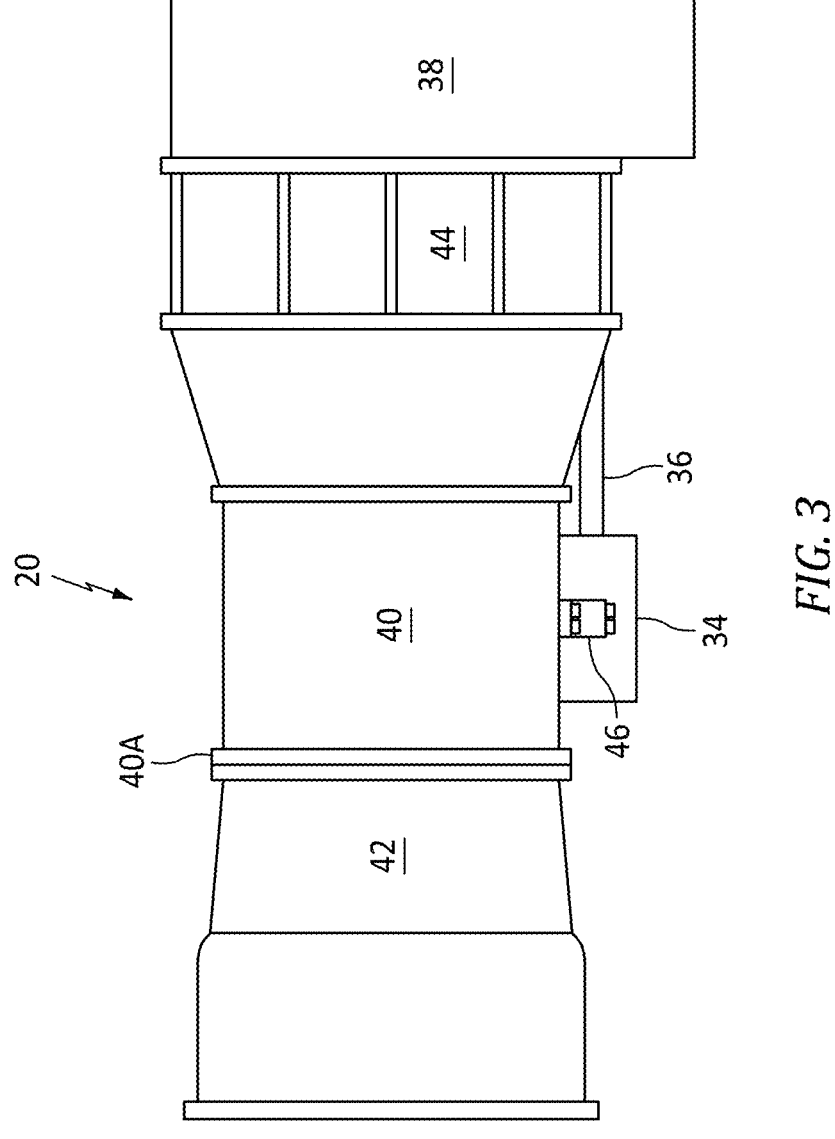
FIG. 3 is a diagrammatic side view of a portion of a gas turbine engine.
Figure 4:
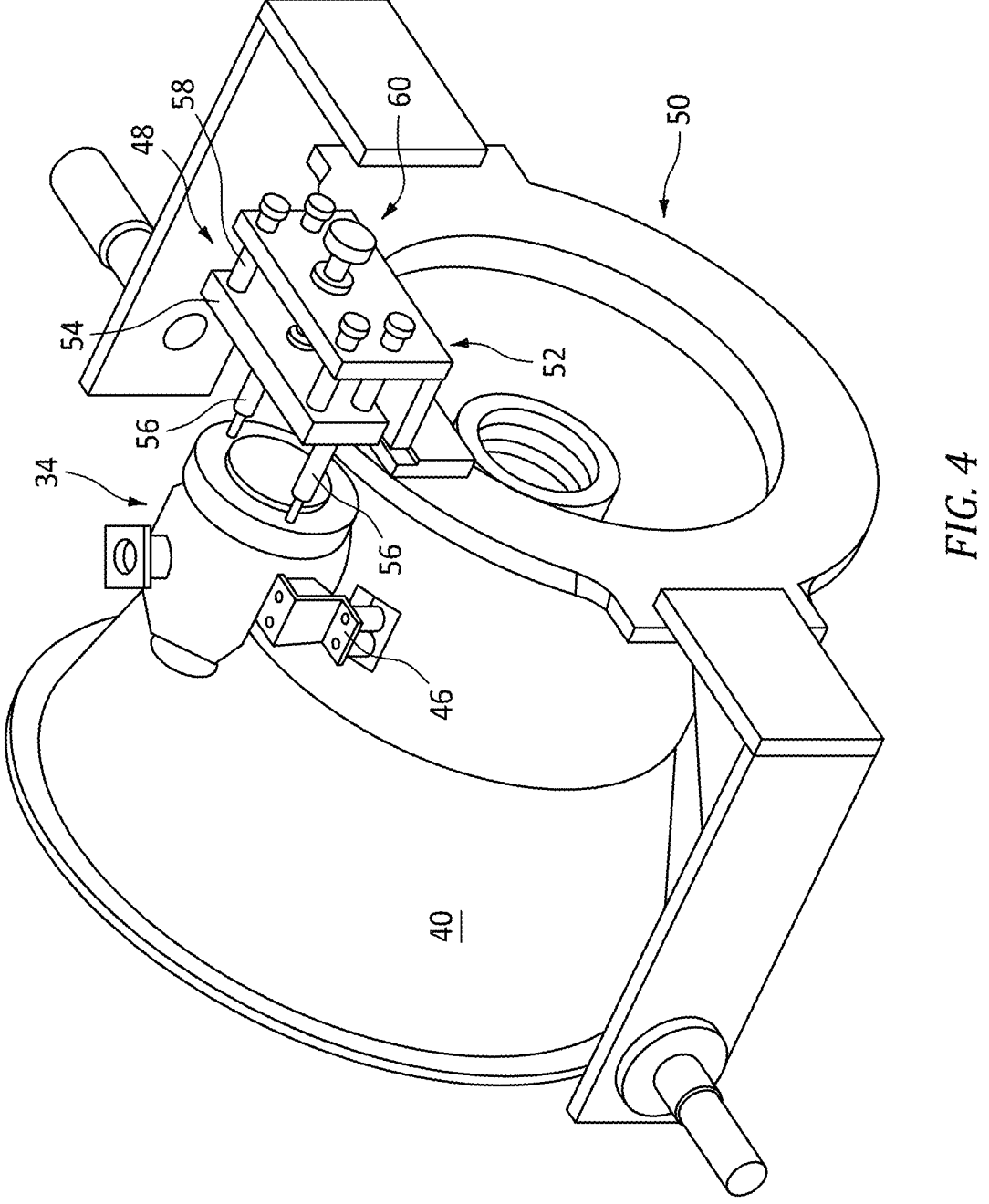
FIG. 4 diagrammatically illustrates an engine case and angle gear box attached to a portion of a build stand.

FIG. 3 is a diagrammatic side view of a portion of the gas turbine engine 20. The angle gearbox 34 is attached to an intermediate case 40. A compressor case 42 is disposed forward of the intermediate case 40. An engine inlet 44 is disposed aft of the intermediate case 40. An accessory gearbox 38 is disposed aft of engine inlet 44. A lay shaft 36 extends between the angle gearbox 34 and the accessory gearbox 38. The alignment of the angle gearbox 34 relative to the lay shaft 36 is important for reasons including maintaining acceptable alignment and engagement of the gears within the angle gearbox 34. In addition, as indicated above the output shaft of the angle gearbox 34 is engaged with the lay shaft 36. FIG. 2 diagrammatically illustrates a splined connection 35 between the output shaft of the angle gearbox 34 and the lay shaft 36. In those embodiments that include a splined connection 35 between the output shaft of the angle gearbox 34 and the lay shaft 36, the alignment of the angle gearbox 34 relative to the lay shaft 36 is important to facilitate the splined connection 35. FIGS. 3 and 4 diagrammatically illustrate a non-limiting example of mounting brackets 46 that may be used to attach the angle gearbox 34 to the engine 20; e.g., attach the angle gearbox 34 to the intermediate case 40.

Referring to FIG. 4, embodiments of the present disclosure include a methodology that utilizes an alignment tool 48 to align the angle gearbox 34 within acceptable tolerance levels. The alignment tool 48 is configured to positionally locate the angle gearbox 34 by locating a surface on the angle gearbox 34 relative to a flange of the intermediate case 40 of the engine 20. Once the angle gearbox 34 is positioned using the alignment tool 48, the angle gearbox 34 can be secured to the engine case (e.g., the intermediate case 40) using the mounting brackets 46 shown in FIGS. 3 and 4. Thereafter, the alignment between the angle gearbox 34 and the lay shaft 36 is within acceptable tolerances.

Figure 5:
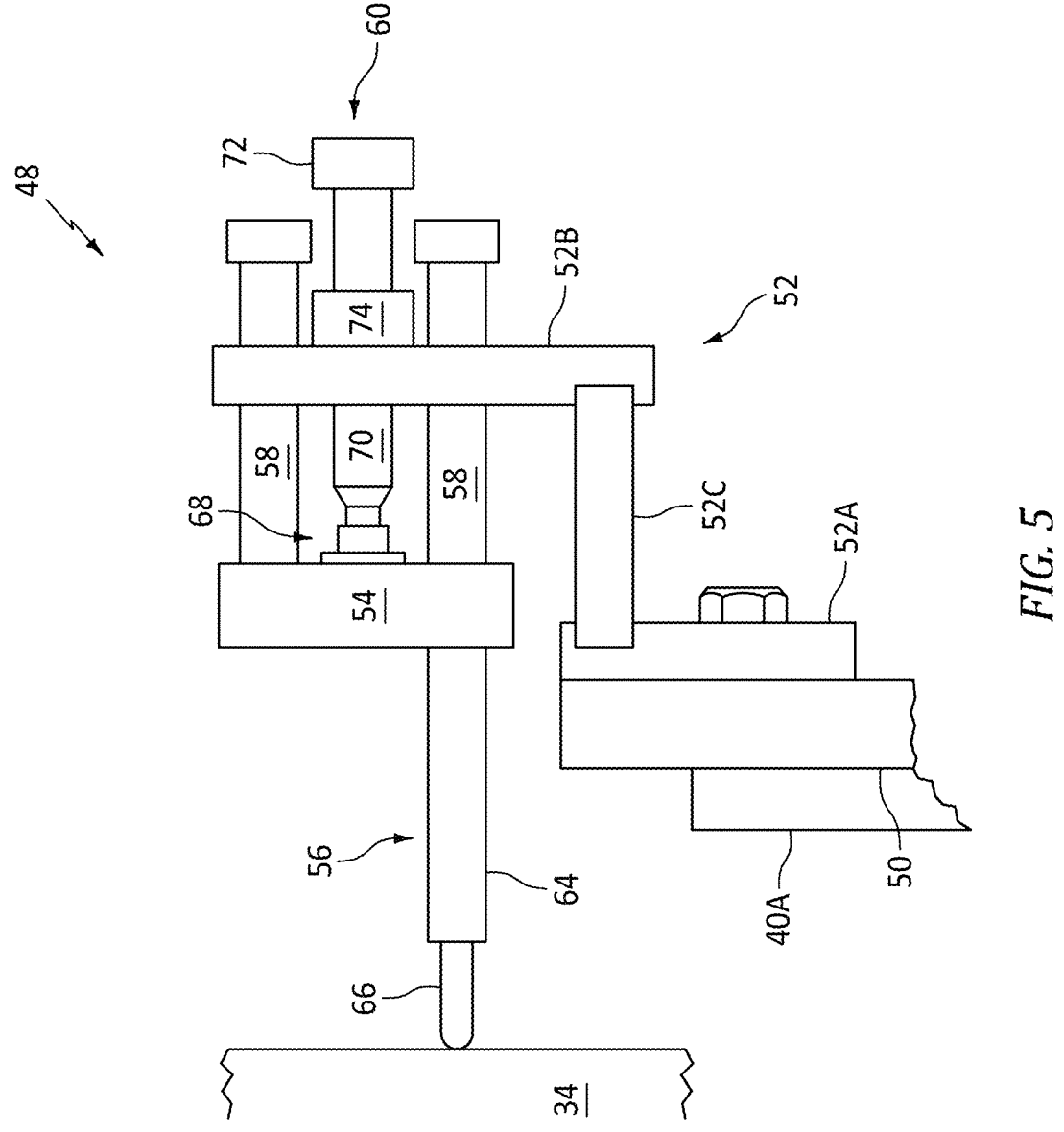
FIG. 5 is a diagrammatic side view of an alignment tool embodiment.
Figure 6:
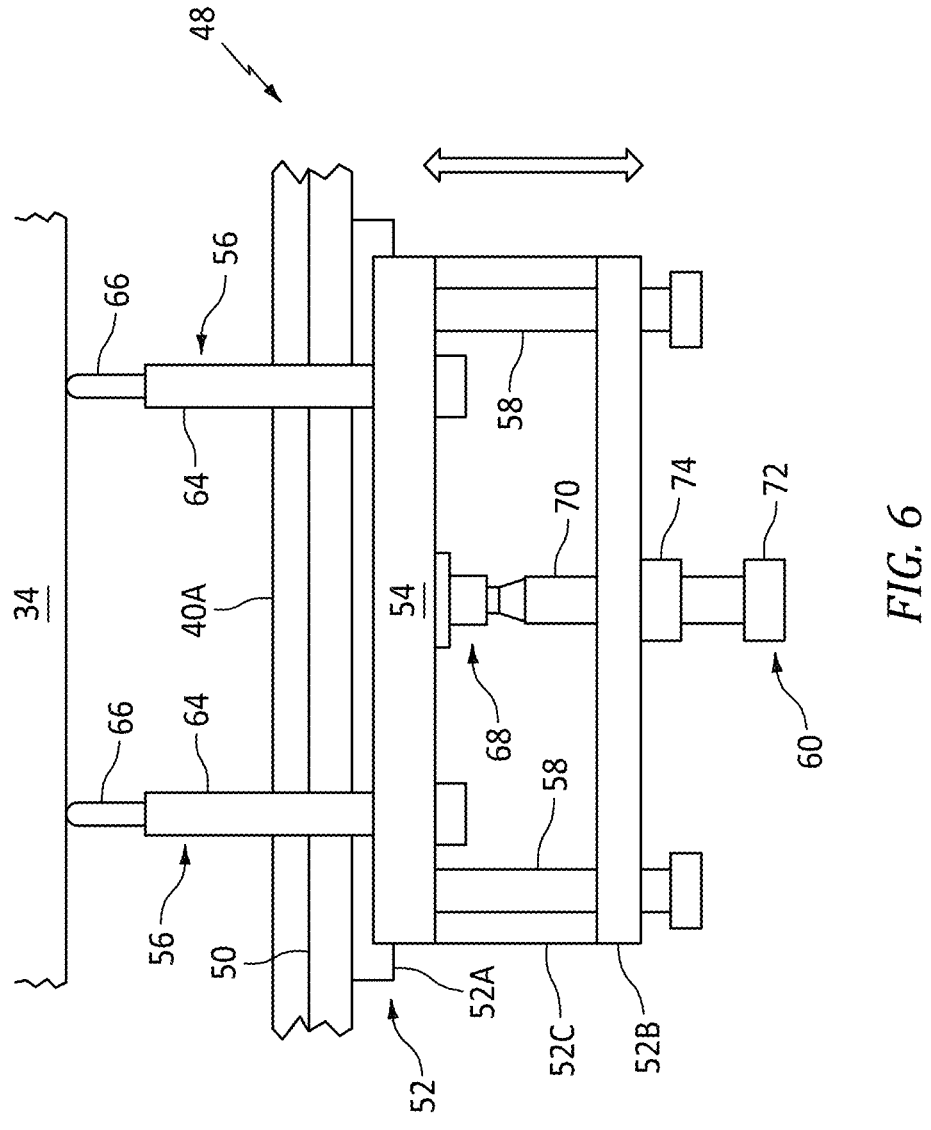
FIG. 6 is a top view of the alignment tool embodiment shown in FIG. 5.

FIG. 4 diagrammatically illustrates a portion of a build stand and the alignment tool 48 attached to the build stand portion. More specifically, the alignment tool 48 is attached to a portion of the build stand referred to hereinafter as the "build stand frame 50". The build stand frame 50 is configured for attachment to a flange 40A (see FIGS. 3 and 5) of the intermediate case 40 of the engine 20. The intermediate case flange 40A is the connection point between the intermediate case 40 and the compressor case 42 when the engine 20 is assembled. The build stand frame 50 is further configured to mount the alignment tool 48 at a position in-line with the angle gearbox 34. FIGS. 4-6 illustrate an example of an alignment tool 48 that may be used to positionally locate the angle gearbox 34 relative to the flange 40A of the intermediate case 40. The present disclosure is not limited to the alignment tool 48 example shown in FIGS. 4-6.

Referring to FIGS. 4-6, the nonlimiting example of the alignment tool 48 includes a support flange 52, a probe plate 54, a plurality of probe pins 56, a plurality of slide rods 58, and an axial adjustment mechanism 60.

The support flange 52 includes a first segment 52A, a second segment 52B, and a third segment 52C. The first segment 52A is attached to a first end of the third segment 52C, and the second segment 52B is attached to a second end of the third segment 52C, wherein the second end is opposite the first end. The first, second, and third segments 52A-C may be described as being roughly in the shape of an "Z", with the first and second segments 52A, 52B parallel one another, and the third segment 52C extending perpendicular to the first and second segments 52A, 52B. The present disclosure is not limited to this particular support flange 52 embodiment. As diagrammatically shown in FIG. 5A, the first, second, and third segments 52A-C may be attached to one another by mechanical fasteners. Other attachment mechanisms (e.g., weldments, or the like) may be used alternatively. The first segment 52A is configured to be attached to the intermediate case 40 by fasteners. For example, the first segment 52A may have a plurality of apertures that align with fastener apertures disposed within the intermediate case flange 40A. In this manner, mechanical fasteners may be used to attach the first segment 52A (and therefore the support flange 52) to the intermediate case flange 40A. The second segment 52B includes a number of slide rod apertures equal to the number of slide rods 58 used in the alignment tool 48. In the embodiment shown in FIGS. 4-6, the alignment tool 48 includes four slide rods 58. Hence, the support flange second segment 52B includes four slide rod apertures. The second segment 52B further includes an adjustment mechanism aperture 61.

Figure 5A:
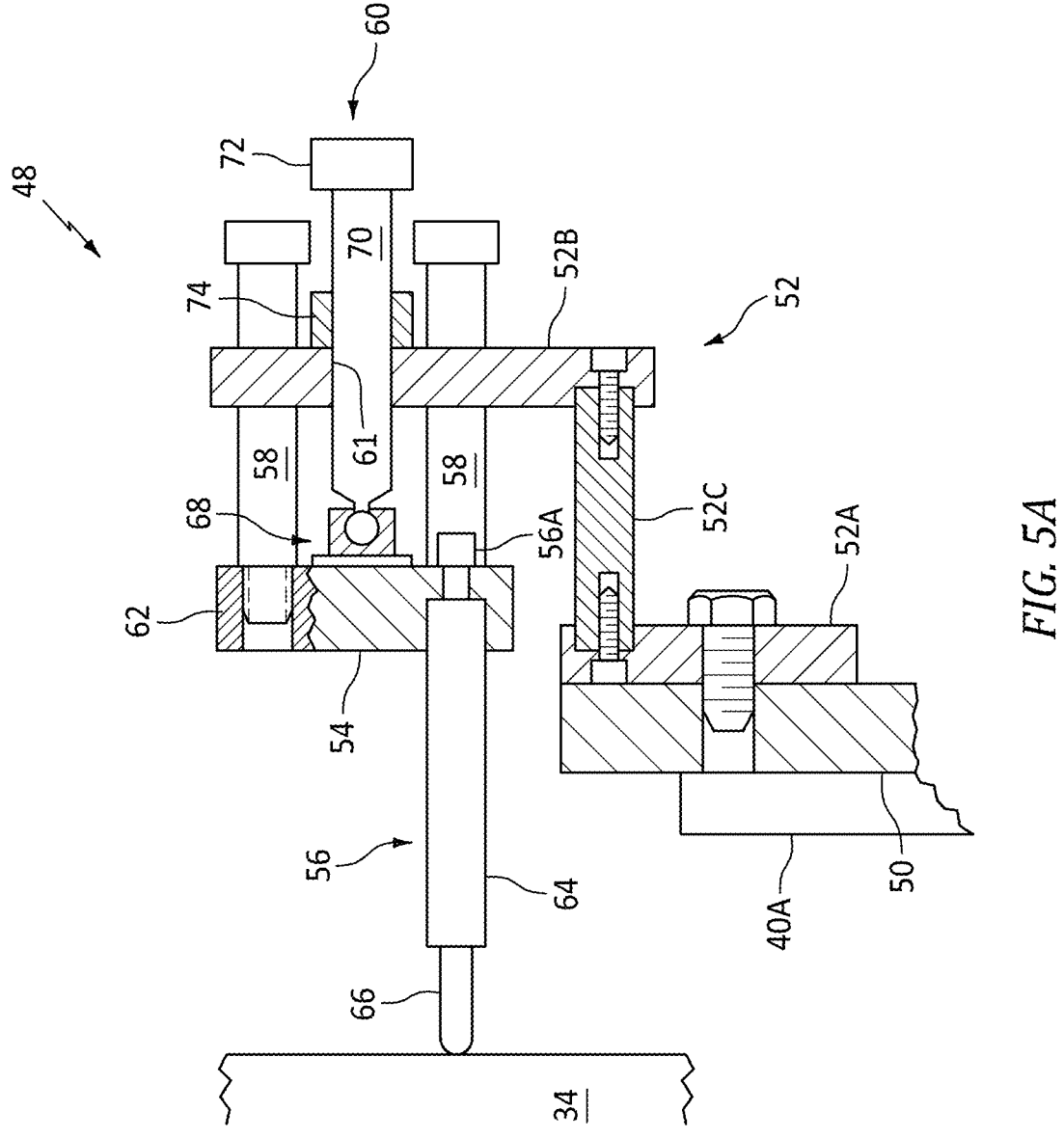
FIG. 5A is a partially sectioned view of the alignment tool embodiment shown in FIG. 8.

The probe plate 54 is configured for attachment to the slide rods 58. FIG. 5A is a sectional view of the alignment tool 48 with the sectional plane extending through the rotational axis of a probe pin 56. To facilitate the description herein, FIG. 5A includes an additional sectioned region 62 of the probe plate 54 with the sectional plane extending through the rotational axis of a slide rod 58 to illustrate an embodiment wherein a slide rod 58 is in threaded engagement with the probe plate 54. The present disclosure does not require the slide rods 58 to be threadedly engaged with the probe plate 54; i.e., the slide rods 58 may be attached to the probe plate 54 by other means such as a weldment, or by fasteners, or the like. The probe plate 54 is further configured to permit attachment of the probe pins 56 to the probe plate 54. In the embodiment diagrammatically shown in FIG. 5A, the probe pins 56 are attached to the probe plate 54 by a mechanical fastener. The present disclosure does not require the probe pins 56 to be attached by mechanical fastener.

In the embodiment shown in FIGS. 4-6, the probe pins 56 include a shaft 64 and a contact element 66. The shaft 64 extends axially between a first end and a second end. The contact element 66 extends axially out from the first end of the shaft 64. The contact element 66 may be integral with the shaft 64 or it may be attached to the shaft 64. In those embodiments wherein each probe pin 56 is attached to the probe plate 54 by a mechanical fastener 56A, the second end of the shaft 64 may be configured for threaded engagement with the mechanical fastener 56A. The present disclosure does not require a probe pin 56 to include a contact element 66.

The axial adjustment mechanism 60 is configured to engage with the probe plate 54 and move the probe plate 54 (and therefore the probe pins 56) axially relative to the support flange 52. During axial movement of the probe plate 54 relative to the support flange 52, the slide rods 58 slide through the respective slide rod apertures. In the example embodiment shown in FIGS. 4-6, the axial adjustment mechanism 60 includes a rotational couple 68, a shaft 70, a head 72, and a locking device 74. The rotational couple 68 is disposed at a first axial end of the shaft 70 and the head 72 is attached to a second axial end of the shaft 70. FIG. 5A diagrammatically illustrates a rotational couple 68 in the form of a ball joint; i.e., a sphere and mating housing that permits rotation there between. In this embodiment, the housing portion of the ball joint may be attached to the probe plate 54 and the ball attached to the shaft 70. The present disclosure is not limited to this example of a rotational couple 68. The head 72 may be integral with the shaft 70. The shaft 70 may be in threaded engagement with the second segment 52B of the support flange 52; e.g., the adjustment mechanism aperture 61 may be in threaded engagement with the shaft 70. The locking device 74 may be a nut that is threaded engagement with the shaft 70. The position of the probe plate 54 and probe pins 56 may be "locked in" by rotating the locking device 74 (e.g., nut) into engagement with the second segment 52B of the support flange 52. The locking device 74 may also be configured to act as a locating device; e.g., the locking device 74 (functioning as a locating device) is disposed on the shaft 70 of the axial adjustment mechanism 60 at a position such that the shaft 70 is axially translated until the locking device 74 contacts the second segment 52B of the support flange 52 at which point the probe pins 56 are located in their desired position. FIG. 6 is a diagrammatic top view of the alignment tool 48, illustrating an example of the relative positioning of the probe pins 56, slide rods 58, and the axial adjustment mechanism 60. The arrow indicates the travel directions of the probe plate 54 and probe pins 56 relative to the support flange 52, the angle gearbox 34, and the flange of the intermediate case 40.

To mount the angle gearbox 34 in proper alignment, the first segment 52A of the support flange 52 may be attached directly or indirectly to the flange 40A of the intermediate case 40. As described herein and shown in FIG. 4, in some instances the alignment tool 48 may be attached to a portion of a build stand (i.e., the "build stand frame 50") and the build stand frame 50 may be attached to the flange 40A. The axial adjustment mechanism 60 of the alignment tool 48 can be operated to move the probe plate 54 and attached probe pins 56 to undeployed position where the probe pins 56 are clear of angle gearbox 34. The angle gearbox 34 can be initially positioned relative to the intermediate case 40. In this initial position, the angle gearbox 34 may be engaged with the tower shaft assembly 32 and the angle gearbox mounting brackets 46 can be loosely installed; e.g., the mounting brackets 46 may be fixed to the angle gearbox 34 or the intermediate case 40, but not both. The axial adjustment mechanism 60 of the alignment tool 48 can then be operated to move the probe pins 56 into engagement with a predetermined surface of the angle gearbox 34. The relative positioning of the probe pins 56 may be determined in advance such that when the probe pins 56 are in contact with the angle gearbox surface, the angle gearbox 34 is properly aligned. In some embodiments, the desired position of the probe pins 56 may be determined in advance by disposing the locking device 74 of the axial adjustment mechanism 60 (functioning as a locating device) at a position on the shaft 70 of the axial adjustment mechanism 60; e.g., the shaft 70 is rotated until the locking device contacts the second segment 52B of the support flange 52 at which point the probe pins 56 are disposed in the desired position. In some embodiments, the probe pins 56 may be secured in a desired position by causing the locking device 74 of the axial adjustment mechanism 60 to engage with the second segment 52B of the support flange 52; e.g., threaded engagement of the locking device 74 can torque the locking device 74 against the second segment 52B of the support flange 52 thereby securing the position of the probe pins 56. Once the angle gearbox 34 is properly aligned, the mounting brackets 46 can be finally secured (e.g., torqued in place) to ensure the angle gearbox 34 remains in the aligned position. In the aligned position, the angle gearbox 34 may be engaged with the lay shaft 36 and the lay shaft 36 will in turn be properly aligned with the angle gearbox 34.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A method of positionally aligning a gearbox of a gas turbine engine, comprising:
   providing an alignment tool that includes a plurality of probe pins and a support flange, wherein the plurality of probe pins is axially translatable;
   attaching the alignment tool to an engine case of the gas turbine engine;
   engaging the gearbox with the engine case;
   positionally aligning the gearbox by contacting a first surface of the gearbox with a first probe pin of the plurality of probe pins, and contacting a second surface of the gearbox with a second probe pin of the plurality of probe pins; and
   securing the gearbox to the engine case while the first probe pin is in contact with the first surface of the gearbox and the second probe pin is in contact with the second surface of the gearbox.

2. The method of claim 1, wherein the first surface of the gearbox and the second surface of the gearbox are the same surface.

3. The method of claim 1, wherein the support flange includes a support flange first segment configured for attachment to the engine case, and wherein the alignment tool further includes an axial adjustment mechanism in communication with the plurality of probe pins, wherein the axial adjustment mechanism is engaged with the support flange and is configured to axially translate the plurality of probe pins relative to the support flange.

4. The method of claim 3, wherein the alignment tool further includes a plurality of slide rods and a probe plate;
   wherein the plurality of slide rods are attached to the probe plate and are in sliding engagement with the support flange.

5. The method of claim 4, wherein the axial adjustment mechanism includes a shaft and a rotational couple;
   wherein the shaft is threadedly engaged with the support flange, and the rotational couple is engaged with the probe plate; and
   wherein the step of positionally aligning the gearbox includes axially translating the first probe pin into contact with the first surface of the gearbox and the second probe pin into contact with the second surface of the gearbox by rotating the shaft of the axial adjustment mechanism.

6. The method of claim 5, wherein the support flange further includes a support flange second segment disposed parallel with the support flange first segment, and a support flange third segment extending between the support flange first segment and the support flange second segment; and
   wherein the shaft is threadedly engaged with the support flange second segment.

7. The method of claim 6, wherein the axial adjustment mechanism includes an adjustable locating device configured to locate a position of the probe pins; and the method further includes:

rotating the shaft of the axial adjustment mechanism until the adjustable locating device is engaged with the support flange second segment.

8. The method of claim 6, wherein the axial adjustment mechanism includes an adjustable locking device configured to positionally lock the probe pins; and the method further includes:

positionally locking the probe pins by engaging the support flange second segment with the locking device.

9. The method of claim 1, wherein the step of attaching the alignment tool to the engine case of the gas turbine engine includes attaching the alignment tool to a flange of the engine case.

10. The method of claim 1, wherein the step of attaching the alignment tool to the engine case of the gas turbine engine includes indirectly attaching the alignment tool to a flange of the engine case.

* * * * *